Oct. 23, 1923.

P. F. HALFERTY

FLY HOOK

Filed July 12, 1922

WITNESSES

INVENTOR
P. F. Halferty
BY
ATTORNEYS

Oct. 23, 1923.
P. F. HALFERTY
FLY HOOK
Filed July 12, 1922

Patented Oct. 23, 1923.

1,471,959

UNITED STATES PATENT OFFICE.

PETER F. HALFERTY, OF ABERDEEN, WASHINGTON.

FLY HOOK.

Application filed July 12, 1922. Serial No. 574,444.

*To all whom it may concern:*

Be it known that I, PETER F. HALFERTY, a citizen of the United States, and a resident of Aberdeen, in the county of Grays Harbor and State of Washington, have invented a new and Improved Fly Hook, of which the following is a description.

My invention while adapted for use with plain fish hooks adapted to receive a bait is more especially intended for embodiment in a fly hook.

The present invention is particularly intended to constitute an improvement on the fly hook forming part of the subject matter of an application filed by me January 20th, 1922, for a fly hook and leader, Serial Number 530,623.

The general object of the present invention is to provide a hook having an improved means for effecting engagement with the terminal of a fish line, a leader, or a snell and with a view to facilitate the attaching and detaching of the hook while at the same time guarding against the possibility of accidental detachment of the hook.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1:
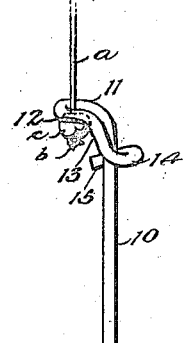
Figure 1 is a side elevation of a fish hook embodying my invention.
Figure 2:
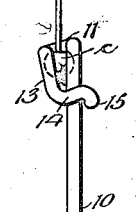
Figure 2 is an elevation at right angles to Figure 1.
Figure 6:
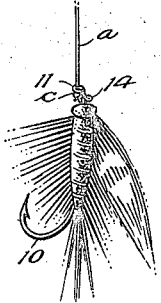
Figure 6 is a perspective view of a fly hook embodying the invention, Figures 1 and 2 being shown exaggerated to more clearly bring out the novel features of the hook.

In accordance with the present invention the shank of the hook 10 at the upper end thereof is formed with a lateral loop 11 formed by returning the material on itself. The sides of the loop are spaced to accommodate a leader, a fragment of which is conventionally indicated at *a*. Said indicated portion *a* may be taken as representing either a leader, a fish line, or a snell. The returned portion of the material is at right angles to the axis of the shank 10 of the hook at the terminal end 12 of the return portion and is formed with an incline 13 extending from the said portion 12 to the shank. From the incline 13 the material is carried transversely across the shank as at 14 to the opposite side of the shank from the portions 12, 13 so that the terminal 15 will lie at one side of the shank and the portions 12, 13 at the opposite side. The terminal 15 and the incline 13 are spaced from the shank sufficiently to permit entrance and removal of the leader or the like which has a suitable knot *b* at the end and advantageously a bead *c* loose on the leader above the knot.

Figure 3:
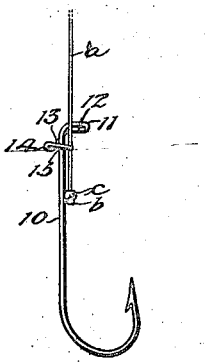
Figures 3 to 5 are views largely diagrammatic given to illustrate the manner of securing the fish hook.
Figure 4:
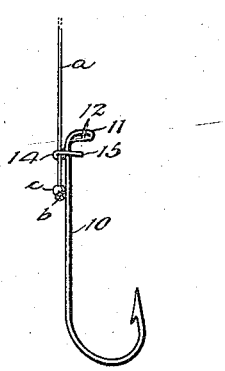
Figure 5:
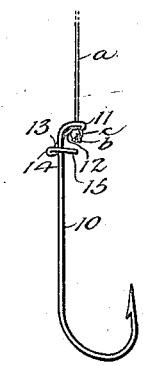
Figure 7:
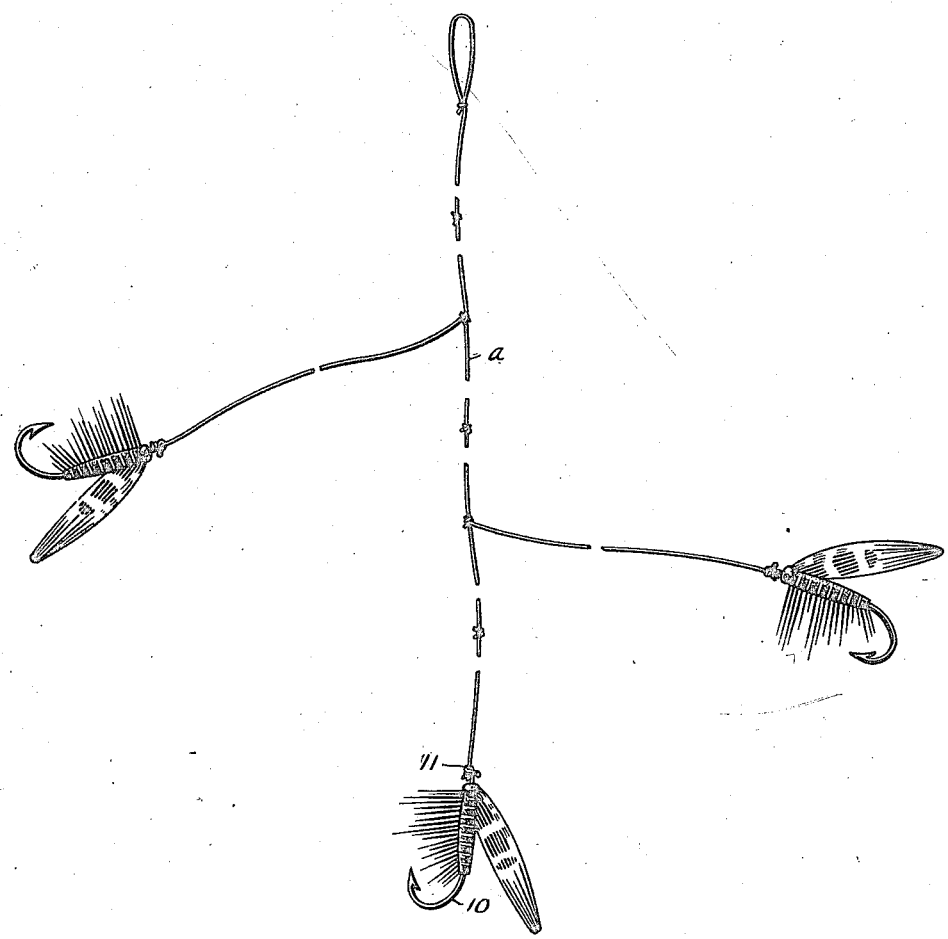
Figure 7 is an elevation of a leader and snells equipped with fly hooks embodying my present invention.

With the above described arrangement the leader *a* is entered in the manner shown in Figures 3 to 5, said leader being first placed approximately parallel with the shank 10 adjacent the terminal 15 and passed along said terminal between the same and the shank, along the transverse member 14 to the incline 13 between said incline and the shank, the shank at this point being formed into the loop 11.

The terminal formed by the knot *b* and bead *c* or the knot alone will be guided upwardly at the under side of the incline 13 to the terminal 12. The result obtained by the leader or snell engaged with the described hook is that a swivel connection is provided permitting a turning of the hook about the axis of the snell or leader and also the incline 13 overcomes any tendency of the leader or snell to move toward the terminal 15 to become accidentally disconnected, the connections serving to maintain the leader or snell at the right angular terminal 12 of the loop.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A fish hook having at the upper end a laterally disposed loop, the material of the shank being return-bent at said loop, the sides of the loop being spaced to accommodate a leader or the like, and the material being carried from said loop transversely to the opposite side of the hook and spaced from the leader, the said loop rising above the terminal of the return portion.

2. A fish hook having at the upper end a laterally disposed loop, the material of the shank being return-bent at said loop, the sides of the loop being spaced to accommodate a leader or the like, and the material being carried from said loop transversely to the opposite side of the hook and spaced from the leader, the said loop rising above the terminal of the return portion, there being an inclined portion on said loop between the upper end thereof and the plane of the terminal of the return portion.

3. A fish hook having the material at the shank at the upper end of the latter return bent into loop form, the material being carried from said loop transversely across to the opposite side of the shank, said terminal and loop presenting a space for the entrance and removal of the leader or the like, and said loop presenting an incline between the entrance to the loop and the upper terminal of the loop, to prevent an accidental removal of the leader from the hook, said upper terminal being deflected laterally at right angles.

4. A fish hook having a loop at the upper end of the shank, said loop presenting a terminal portion at right angles to the axis of the shank of the hook, the loop affording entrance or removal for a leader or the like and having an incline between said entrance and said terminal to prevent accidental disconnection of the leader from the hook; together with a flexible element on which said hook has a swivelled connection at said terminal of the loop.

5. A fish hook having the material at the shank at the upper end of the latter return bent into loop form, the material being carried from said loop transversely across to the opposite side of the shank, said terminal and loop presenting a space for the entrance and removal of the leader or the like, and said loop presenting an incline and a more abrupt lateral deflection at the bend of the loop to which said laterally deflected portion said incline leads.

PETER F. HALFERTY.